United States Patent [19]

Ober et al.

[11] Patent Number: 4,617,249

[45] Date of Patent: Oct. 14, 1986

[54] DISPERSION POLYMERIZATION PROCESS FOR TONER COMPOSITIONS

[75] Inventors: Christopher K. Ober, Oakville; Kar P. Lok, Sarnia, both of Canada

[73] Assignee: Xerox Corporation, Stamford, Conn.

[21] Appl. No.: 755,391

[22] Filed: Jul. 16, 1985

[51] Int. Cl.$^4$ .................. G03G 11/00; G03G 9/08
[52] U.S. Cl. ............................. 430/137; 430/109
[58] Field of Search ...................... 430/137, 109

[56] References Cited

U.S. PATENT DOCUMENTS

| | | | |
|---|---|---|---|
| Re. 31,072 | 11/1982 | Jadwin et al. | 430/99 |
| 3,401,213 | 9/1968 | Trementozzi et al. | 260/880 |
| 3,941,898 | 3/1976 | Sadamatsu et al. | 427/18 |
| 4,156,034 | 5/1979 | Mukoh et al. | 430/106 |
| 4,237,257 | 12/1980 | Moriya et al. | 526/331 X |
| 4,287,281 | 9/1981 | Bayley | 430/107 |
| 4,448,871 | 3/1984 | Tamaki et al. | 430/109 |
| 4,486,559 | 12/1984 | Murata et al. | 528/128 X |

FOREIGN PATENT DOCUMENTS 837965  6/1981  U.S.S.R. .

*Primary Examiner*—John D. Welsh
*Attorney, Agent, or Firm*—E. O. Palazzo

[57] ABSTRACT

Disclosed is an improved process for the preparation of polymer particles which comprises (1) providing a solvent medium having dispersed therein steric stabilizers, monomers, and initiator compounds; (2) subsequently adding thereto a crosslinking compound; (3) affecting polymerization of the resulting mixture by heating; and (4) thereafter separating the particles formed.

12 Claims, No Drawings

DISPERSION POLYMERIZATION PROCESS FOR TONER COMPOSITIONS

BACKGROUND OF THE INVENTION

This invention is generally directed to processes for affecting the preparation of particles useful for incorporation into toner compositions. More specifically, the present invention is directed to dispersion polymerization processes for obtaining tough toner compositions that do not require jetting subsequent to the preparation thereof. Therefore, the process of the present invention relates to the preparation of polymer particles by the dispersion polymerization of monomers in the presence of known steric stabilizers and a crosslinking compound, which particles subsequent to being admixed with pigments are useful as toner compositions. The aforementioned toner compositions are of increased mechanical modulus derivable from sufficient polymer crosslinking; and further, there is obtained tone particles with a diameter of less than about 15 microns rendering it unnecessary to subject these particles to a jetting step as is affected in prior art processes. The toner compositions resulting from the process of the present invention are particularly useful for the development of images in electrostatic imaging processes wherein the imaging members selected can be positively or negatively charged.

The development of images, and in particular electrostatic images utilizing developing compositions with toner materials, is well known. In many of these processes, an electrostatic latent image that is formed on a photoconductor member is developed with a toner composition comprised of resin particles and carbon black. Subsequently, the developed image is transferred to a suitable substrate wherein fixing is accomplished by heat. Accordingly, final copies of the image are produced by heating the toner to a temperature at which it begins to flow enabling fusing thereof to a supporting substrate such as paper. Various suitable toner and developer compositions can be used in these processes. Recently, for example, there has been disclosed positively charged toners with charge enhancing additives, enabling their use in process wherein the imaging member is negatively charged. Thus, for example, there is described in U.S. Pat. No. 3,893,935 the use of quaternary ammonium salts as charge control agents for electrostatic toner compositions. According to the disclosure of this patent, certain quaternary ammonium salts when incorporated into a toner provided a composition which exhibited relatively high uniform stable net toner charge when mixed with a suitable carrier vehicle.

There is also described in U.S. Pat. No. 2,986,521 reversal developer compositions comprised of toner resin particles coated with finely divided colloidal silica. According to the disclosure of this patent, the development of electrostatic latent images on negatively charged surfaces is accomplished by applying a developer composition having a positively charged triboelectric relationship with respect to the colloidal silica. Furthermore, there is disclosed in U.S. Pat. No. 4,338,390 developer and toner compositions having incorporated therein a charge enhancing additives organic sulfate and sulfonate compositions. Moreover, disclosed in U.S. Pat. No. 4,298,672 are positively charged toner compositions with resin and pigment particles; and as a charge enhancing additive alkyl pyridinium compounds.

Other patents disclosing toner compositions with charge control additives include U.S. Pat. Nos. 3,944,493; 4,007,293; 4,079,143 and 4,394,430. Further, of interest with respect to crosslinked toner particles and polymerization processes for affecting the preparation thereof are U.S. Pat. Nos. 31072; 3,401,213; 3,941,898; 4,287,281; 4,448,871 and USSR Pat. No. 837,965.

Polymerization processes for obtaining toner compositions are also known. There is thus disclosed in U.S. Pat. No. 4,282,304 a suspension polymerization method wherein magnetic particles are first mixed with monomer together with an initiator, and subsequently the mixture is suspended in an aqueous medium where a reaction occurs within each particle. The aforementioned polymerization processes for obtaining toner compositions require monomers that are immiscible in the suspending medium, that is, a two phase system is present. Accordingly, the process described in the '304 patent selects a monomer and suspending medium that are mutually immiscible. Thus, the particle size control characteristics are an indirect property of the reacting system, and further the particle sizes generated are not a result of the mechanical dispersion processes as detailed in these patents. In other known dispersion polymerization processes, the monomer and suspending agents are initially miscible, thus a single phase system forms; however, the resulting polymer obtained subsequent to polymerization is insoluble in the mixture. The particle sizes of the particles obtained in the latter dispersion polymerization process is dependent upon the reacting components and their resulting aggregation behavior.

In a copending application U.S. Ser. No. 549,933 filed 11-9-83 now U.S. Pat. No. 4,524,199 entitled Stable Polymeric Dispersion and Methods for Making, the disclosure of which is totally incorporated herein by reference, there is described a stable polar dispersion, and a process thereof with nonionic amphipathic steric stabilizers irreversibly anchored to a monomer. Stabilizers disclosed in this copending application include hydroxyethyl cellulose.

Furthermore, in a related copending application U.S. Ser. No. 722,100, filed 4-11-85, entitled Toner Compositions and Dispersion Polymerization Process, the disclosure of which is totally incorporated herein by reference, there is disclosed dispersion by polymerization processes wherein the stabilizers selected are chemically treated. More specifically, there is provided in accordance with the invention of this copending application a dispersion polymerization process which comprises providing a medium having dispersed therein monodispersed particles comprised of a thermoplastic resin core which is substantially insoluble in the dispersion medium, irreversibly anchoring thereto certain stabilizers, and subsequently transforming the surface of the stabilizer by the reaction with compositions selected from the group consisting of alkyl halides, carboxylic acids, and aliphatic alcohols.

Also, there is disclosed in U.S. Pat. Nos. 4,394,430 and 4,323,634 crosslinked polymers, which in contrast to linear polymers are generally insoluble. Toners with the aforementioned crosslinked resins have tough physical properties, and thus are very difficult to subject to jetting processes.

There thus is a need for improved processes for obtaining crosslinked particles without jetting useful for the formulation of toner compositions that can be selected for imaging systems. Also, there is a need for dispersion polymerizations; and wherein there results toner particles of a diameter of from about 1 micron to about 20 microns without jetting. More specifically, there remains a need for toner compositions prepared by a dispersion polymerization process wherein the difunctional monomer or crosslinking component selected is formulated into a copolymer or terpolymer. Also, there is a need for processes that permit the preparation of toner compositions of a positive polarity, or a negative polarity without jetting. Moreover, there continues to be a need for generating particles by dispersion polymerization, without jetting and where the resulting toner compositions have low fusing temperatures, that is, less than about 150° C.; and wherein the resulting charge enhancing additive stabilizer moiety is retained, and not leached from the toner composition. Also, there is a need for dispersion processes wherein jetting is eliminated, and there can be affected an optional chemical transformation of the stabilizer compounds by reactions with alkyl halides, organic carboxylic acids and organic alcohols, especially aliphatic alcohols, enabling the selection of the charge polarity for the resulting toner compositions prior to the preparation thereof. Additionally, there is a need for dispersion prepared crosslinked toner compositions with desirable admix charging properties, and appropriate triboelectric charging values permitting these compositions to be highly useful in xerographic imaging methods.

SUMMARY OF THE INVENTION

It is an object of the present invention to provide processes for particles, and toner compositions thereof which overcome several of the above noted disadvantages.

A further object of the present invention resides in the provision of dispersion polymerization processes wherein toner particles of the appropriate size diameter can be obtained without jetting.

A further specific object of the present invention resides in the provision of dispersion polymerization processes wherein crosslinked toner particles of the appropriate size diameter can be obtained without jetting.

In an additional object of the present invention there are provided dispersion processes wherein the stabilizers selected are optionally chemically transformed causing the surface thereof to function as charge enhancing additive sites.

A further object of the present invention resides in the provision of toner dispersion process wherein the stabilizers selected are chemically transformed by alkyl halides, carboxylic acids, and aliphatic alcohols enabling the surface thereof to function as charge enhancing additive sites.

In a further object of the present invention there are provided dispersion polymerization processes wherein the resulting toner compositions are of an appropriate size diameter, and of a low fusing temperature.

An additional object of the present invention resides in the provision of dispersion processes wherein the resulting crosslinked toner compositions can be selected for use in developing images in electrostatic processes.

A further object of the present invention resides in dispersion polymerization processes wherein difunctional monomers are selected for the polymerization.

These and other objects of the present invention are accomplished by the provision of dispersion polymerization processes wherein crosslinked toner compositions are prepared without jetting. More specifically, in one embodiment there is provided in accordance with the present invention a dispersion polymerization process which comprises providing a solvent medium having dispersed therein steric stabilizers, monomer or comonomers, and initiator; subsequently adding thereto a crosslinking compound; and affecting polymerization of the resulting mixture to obtain crosslinked particles of a size diameter of less than about 20 microns. In another embodiment of the present invention, the surface of the stabilizer selected can be transformed by the reaction thereof with compositions selected from the group consisting of alkyl halides, carboxylic acids, and aliphatic alcohols.

In one specific important embodiment of the present invention there is provided a dispersion polymerization process which comprises providing a solvent medium having dispersed therein steric stabilizers selected from the group consisting of hydroxy celluloses, poly(acrylic acids), poly(vinyl butyral), poly(vinyl pyridines), poly(vinyl pyrrolidone) and their copolymers; subsequently adding thereto styrene monomers and a divinylbenzene crosslinking compound; and thereafter affecting polymerization of the resulting mixture resulting in crosslinked polymer particles with a diameter of less than about 15 microns. These particles can then be isolated from the reaction medium by spray drying or freeze drying, and thereafter formulated into toner compositions by adding thereto known pigments or dyes. The aforementioned crosslinked toner particles need not be subjected to jetting since these particles are of an effective size diameter of less than about 15 microns. Additionally, these particles exhibit a fusing temperature of from about 100° C. to about 150° C., and further are insoluble in most organic solvents.

Various monofunctional monomers can be selected for the process of the present invention including two or more vinyl monomers. Typical vinyl monomeric units are styrene, p-chlorostyrene, vinyl naphthylene; vinyl halides such as vinyl chloride, vinyl bromide, vinyl fluoride, vinyl acetate, vinyl propionate, vinyl benzoate, vinyl butyrate and the like; vinyl esters such as esters of monocarboxylic acids including methyl acrylate, ethyl acrylate, n-butylacrylate, isobutyl acrylate, dodecyl acrylate, n-octyl acrylate, 2-chloroethyl acrylate, phenyl acrylate, methylalphachloro acrylate, methyl methacrylate, ethyl methacrylate, butyl methacrylate, and the like; acrylonitrile, methacrylonitrile, acrylamide; vinyl ethers such as vinyl methyl ether, vinyl isobutyl ether, vinyl ethyl ethers, and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole, N-vinyl pyrrolidone and the like; and mixtures thereof. As preferred monomers, there are selected for the process of the present invention styrene, and copolymers of styrene with acrylate or methacrylates, inclusive of n-butylmethacrylate. Other preferred monomers and mixtures thereof can be selected providing the objects of the present invention are achieved, such as mixtures of styrenes with diolefins, inclusive of butadienes.

Specific examples of stabilizers that can be selected for the process of the present invention are well known, and include hydroxyethyl cellulose, hydroxypropyl cellulose, hydroxybutyl cellulose, hydroxybutylmethyl cellulose, hydroxypropylmethyl cellulose, cellulose propionate; poly(acrylic acid), poly(hydroxyethyl acrylate), poly(methoxypolyethylene glycol acrylate), poly(methacrylic acid), poly(hydroxyethyl methacrylate), and other similar polymers; polyvinyl butyral, poly(ethylene glycol), poly(ethylene oxide), poly(propylene oxide), poly(methylvinyl ether), poly(vinyl pyridine), poly(vinyl pyrrolidone), and their copolymers; and copolymers of maleic acid and maleic anhydride. As crosslinking compounds there can be used for the process of the present invention divinylbenzene, vinyl methacrylate, 2-butene-1,4-diacrylate, 2-butene-1,4-dimethacrylate, diethylene glycol diacrylate, diethylene glycol dimethacrylate, polyethylene glycol dimethacrylate, triethylene glycol diacrylate, tetraethylene glycol diacrylate, triethylene glycol dimethacrylate, tetraethylene glycol dimethacrylate, and other similar crosslinking compounds. The usual polymerization initiator compounds can be added to the reaction mixture such as benzoyl peroxide, lauroyl peroxide, azobis isobutyronitrile, and the like.

With further reference to the process of the present invention, polymerization is generally accomplished at a temperature of from about 50° C. to about 90° C., and preferably from about 65° C. to about 75° C. Further, the monomer concentration is from about 10 percent to about 40 percent by volume of the total reaction mixture. Also, the crosslinking component is present in an amount of from about 0.1 percent by weight to about 1 percent by weight of the weight of the monomer. From about 0.1 percent to about 1 percent by weight of polymerization initiator, based on the weight of the reaction mixture, is selected; and about 0.5 to about 5 percent by weight of stabilizer component is usually employed with the process of the present invention. The reaction time can vary depending on the reactants selected, for example; however, usually polymerization is completed in from about 10 hours to about 35 hours. There results, as determined by melt index, molecular weight, solubility, and thermal measurements, a crosslinked polymer of a weight average molecular weight in excess of 20,000. Toner compositions are achieved by mixing the resulting crosslinked polymer particles with an oil soluble dye as indicated herein. The resulting polymer particles are of a size diameter, as determined by a Coulter Counter, of from 1 to about 20 microns. Further, as the difunctional monomer is present at the beginning of the polymerization, it is incorporated into the monomer; therefore, the formation of polymer chain branches and crosslinks occurs during the particle forming polymerization process. Polymerization can be initiated in a variety of solvents and cosolvents, including aliphatic alcohols, aqueous aliphatic alcohols, and mixtures thereof. The solvent is present in the reaction mixture in an amount of 60 percent to 90 percent by volume.

Also, embraced within the scope of the present invention are dispersion polymerization processes for obtaining crosslinked colored toner compositions containing toner resin particles with the stabilizers illustrated herein; and as colorants black, magenta, cyan and/or yellow chromophores, as well as mixtures thereof.

Numerous well known suitable dyes can be selected as the colorant for the toner particles. Generally, these dyes are present in amounts of from about 1 percent by weight to about 20 percent by weight based on the total weight of the toner composition; however, lesser or greater amounts of dyes can be selected providing the objectives of the present invention are achieved. Thus, colored toner compositions can be prepared by diffusing into the polymer mixture a dye solution comprised of an organic solvent and various known dyes inclusive of red, blue, yellow, cyan, magenta, or mixtures thereof. Specific examples of dyes selected are Oil Blue A, Passaic Oil Green, Sudan Red, Sudan Yellow 146, DuPont Oil Blue A, Passaic Oil Red 2144, Oil Yellow, Sudan Red 7B, Oil Pink 312, Pylachrome Pink LX1900, Sudan Black B, Ceres Blue R, Sudan Deep Black, Ceres Black BN, a dye mixture containing the cyan Savinyl Blue GLS, the magenta Sudan Red 460, and the yellow dye Sudan Yellow 146. The dye is present in the organic solvent in an amount of from about 1 percent by weight to about 50 percent by weight; and preferably in an amount of from about 15 percent by weight to about 25 percent by weight.

Examples of organic solvents that can be selected are methylene chloride, toluene, cyclohexane, butylacetate, and the like, with methylene chloride being preferred. Generally, from about 1 milliliter to about 50 milliliters, and preferably from about 5 milliliters to about 15 milliliters of solvent are selected for each gram of dye to be dissolved therein. Dissolving of the dye is accomplished by simple stirring of the organic mixture comprised of solvent and dye. Subsequent to the evaporation of the solvent from the reaction mixture, the dye is retained in the polymer particles.

The dye solution can be added to the crosslinked polymerized particles with stabilizer thereon in various suitable amounts providing the objectives of the present invention are achieved, however, the dye solution is usually added in an amount of from about 10 percent to about 50 percent by weight of the polymer particles. Upon the addition of the dye solution to the polymerized mixture, an entropic dilution effect due to the initial absence of dye in the particles and the high polymer concentration causes the dye to diffuse through the solvent medium and into the polymer particles. The effectiveness and completion of this diffusion process is dependent on a number of factors including the concentration of the dye, solvent, and polymer particles; the specific types of dyes used; the nature of the particles being treated; and the temperature at which the process is accomplished.

For obtaining the final toner particles, the mixture of polymer and dye particles is subjected to further processing, inclusive of known spray drying or freeze drying methods, permitting toner particles with a size diameter of from about 1 to about 20 microns. In one embodiment, spray drying is affected by forming a stirred suspension of polymer, dye particles and solvent medium. Subsequent to atomization, the resulting suspension can be processed at 120° C. in a drying chamber and collected in a product cyclone. Toner particles isolated in this manner can then be immediately selected for the purpose of developing latent electrostatic images present, for example, on a photoconductive imaging member.

Illustrative examples of carrier particles that can be selected for mixing with the crosslinked toner particles prepared in accordance with the process of the present invention include those particles that are capable of triboelectrically obtaining a charge of opposite polarity to that of the toner particles. Accordingly, the carrier particles of the present invention are selected so as to be of a negative polarity enabling the toner particles which are positively charged to adhere to and surround the carrier particles; or of a positive polarity permitting the toner particles which are negatively charged to adhere to and surround the carrier particles. Illustrative examples of carriers include methyl methacrylate, glass, steel, nickel, iron, ferrites, and the like. Additionally, there can be selected as carrier particles nickel berry as disclosed in U.S. Pat. No. 3,847,604, the disclosure of which is totally incorporated herein by reference, and comprised of nodular carrier beads of nickel characterized by surfaces of reoccurring recesses and protrusions thereby providing particles with a relatively large external area. The carrier particles contain thereover a coating of, for example fluoropolymers, such as polyvinylidene fluoride resins; KYNAR; terpolymers of styrene; methylmethacrylate; and a silane such as triethoxy silane, reference U.S. Pat. Nos. 3,526,533 and 3,467,634, the disclosure of which is totally incorporated herein by reference; tetrafluoroethylene, polymethacrylates, and other suitable known coatings. With methacrylate coatings, the carriers assume a positive charge. Fluoropolymers like KYNAR permit a negatively charged carrier.

Also, the diameter of the carrier particles is generally from about 50 microns to about 1,000 microns permitting them to possess sufficient density and inertia to avoid adherence to the electrostatic images during the development process. The carrier particles can be mixed with the toner particles in various suitable combinations, however, best results are obtained when about 1 part per toner to about 10 parts to about 200 parts by weight of carrier are selected.

Toner and developer compositions prepared in accordance with the process of the present invention may be selected for use in electrostatographic imaging systems, containing therein inorganic photoreceptors, organic photoreceptors, and layered photoreceptor members which are generally charged negatively. Inorganic imaging members include selenium, selenium alloys, such as selenium arsenic, selenium tellurium, and the like; cadmium sulfide; halogen doped selenium substances; and halogen doped selenium alloys. Organic members include squaraine compounds, pyrillium dyes, polyvinylcarbazole 4-dimethylaminobenzylidene, benzhydrazide; 2-benzylidene-aminocarbazole, (2-nitro-benzylidene)-p-bromoaniline; 2,4-diphenyl-quinazoline; 1,2,4-triazine; 1,5-diphenyl-3-methyl pyrazoline 2-(4'dimethyl-amino phenyl)-benzoaxzole; 3-amino-carbazole, polyvinyl carbazole-trinitrofluorenone charge transfer complex; and mixtures thereof.

Illustrative examples of layered photoresponsive devices are comprised of transport layers and photogenerating layers, reference U.S. Pat. No. 4,265,990, the disclosure of which is totally incorporated herein by reference, and other similar layered photoresponsive devices. Examples of generating layers include trigonal selenium, metal phthalocyanines, metal free phthalocyanines and vanadyl phthalocyanines, while examples of charge transport layers include the diamines as disclosed in U.S. Pat. No. 4,265,990.

The following examples are being supplied to further define various species of the present invention, it being noted that these examples are intended to illustrate and not limit the scope of the present invention. Parts and percentages are by weight unless otherwise indicated.

EXAMPLE I

In a typical polymerization, to a 1 liter reaction vessel fitted with a water cooled condenser, nitrogen inlet and mechanical stirrer, there was added a mixture of 106.5 milliliters of 2-methoxy ethanol and 106.5 milliliters of ethanol, followed by heating to 68° C. With stirring, 3.8 grams of hydroxy propyl cellulose stabilizer were dissolved in the ethanol solvent mixture; and subsequently there was added thereto a solution consisting of 38 milliliters of styrene monomer, 1.5 grams of benzoyl peroxide and the quantity of difunctional monomer or crosslinking agent shown in Table 1.

The resulting mixture became cloudy in less than twenty minutes indicating polymerization inaction. Stirring was continued for 15 hours at 68° C., then the temperature was raised to 75° C., for another 10 hours. The resulting particles were isolated from the reaction medium by centrifugation, followed by redispersion in deionized water. After washing the particles with deionized water, the resulting crosslinked polystyrene particles, about 8 microns average diameter, were redispersed in water and freeze dried.

Thereafter, the freeze dried particles were characterized for $T_g$ (glass transition) with a differential scanning colorimeter, and for melt index. Also, there was formulated a mixture of 0.5 gram of the crosslinked freeze dried polystyrene and 2 milliliters of tetrahydrofuran. The molecular weight of the soluble fraction of this mixture was then determined by gel permeation chromatography. The results thereof are as follows:

TABLE 1

| Difunctional Monomer | % by wt. | Molecular Weight ($M_w$) | $T_g$ (°C.) | Melt Index (grams/10 min.) |
|---|---|---|---|---|
| Divinylbenzene | 0.3 | 26,486 | 92.52 | 18.94 |
|  | 0.5 | 28,745 | 90.75 | 5.70 |
|  | 0.75 | 32,400 | 94.64 | 2.70 |
|  | 1.0 | 34,798 | 96.51 | 0.44 |
| Diethylene glycol dimethacrylate | 0.3 | 17,408 | 87.73 | 33.98 |
|  | 0.5 | 18,667 | 89.65 | 29.80 |
|  | 0.75 | 18,696 | 89.83 | 18.81 |
|  | 1.0 | 7,703 | 71.26 | 1.00 |
| Ethylene glycol dimethacrylate | 0.3 | 20,219 | 90.01 | 26.15 |
|  | 0.5 | 19,212 | 88.72 | 28.12 |
|  | 0.75 | 22,662 | 88.53 | 29.40 |
|  | 1.0 | 18,570 | 82.36 | 40.26 |
| Butanediol dimethacrylate | 0.3 | 16,442 | 90.18 | 25.63 |
|  | 0.5 | 16,557 | 87.58 | 30.21 |
|  | 0.75 | 28,012 | 89.89 | 14.92 |
|  | 1.0 | 18,679 | 85.93 | 44.14 |
| NONE | 0.0 | 19,340 | 91.78 | 35.80 |

EXAMPLE II

Toner particles were prepared by dissolving 3.5 grams of poly(acrylic acid) into a stirred mixture of 200 milliliters of denatured alcohol and 16 milliliters of water. This mixture was placed in a 500 milliliter three-neck, round bottom flask with a water cooled condenser, mechanical stirrer and nitrogen gas inlet. After purging the reactor for 30 minutes with nitrogen gas, the stirred mixture was heated to 68° C. Upon temperature equilization, there was added to the flask a solution of 1.5 grams of benzoyl peroxide, 40 milliliters of a 60/40 mixture of styrene and n-butylmethacrylate, and the quantity of divinylbenzene shown in Table 2.

Subsequently, the reaction mixture was stirred at 68° C. for 16 hours and then heated to 75° C. for 10 hours to complete the polymerization. After cooling the reaction mixture, a solution of Oil Blue A dye (2.0 grams) dissolved in 20 milliliters of methylene chloride and 40 milliliters of ethanol was added followed by stirring for 5 hours. The solvent swelled toner particles were then stirred in an open vessel, and the volatile solvent was evaporated to ⅔ of its original volume. The dyed particles were allowed to settle and the ethanol water supernatant was replaced with water. The latter procedure was repeated twice and the particles, suspended in water, were freeze dried. The final toner materials had a triboelectric charge of −35 microcoulombs per gram, as determined in the known Faraday cage apparatus, and the other characteristics listed in Table 2.

TABLE 2

| % Divinyl benzene | Diameter Toner Particles (GSD)* | Melt Index (grams/10 min.) |
| --- | --- | --- |
| 0 | 7.1(1.1) | 96.8 |
| 0.5 | 6.8(1.2) | 5.7 |
| 1.0 | 5.4(1.1) | 1.5 |
| XP707 Resin | — | 15.8 |

*Geometric Standard Direction

Although the invention has now been described with reference to specific preferred embodiments, it in not intended to be limited thereto but rather those skilled is the art will recognize that variations and modifications may be made therein which are within the spirit of the invention and within the scope of the claims.

What is claimed is:

1. An improved dispersion polymerization process for the preparation of polymer particles consisting essentially of (1) providing a solvent medium having dispersed therein steric stabilizers selected from the group consisting of hydroxy celluloses, poly(acrylic acid), poly(vinyl butyral), poly(vinyl pyridines), poly(vinyl pyrrolidone), and their copolymers, monomers, and initiator compounds; (2) subsequently adding thereto a crosslinking compound; (3) affecting polymerization of the resulting mixture by heating; and (4) thereafter separating the particles formed of a diameter of from about 5 to about 20 microns.

2. A process in accordance with claim 1 wherein the crosslinking compound is divinyl benzene.

3. A process in accordance with claim 1 wherein polymerization is affected at a temperature of from about 50° C. to about 95° C.

4. A process in accordance with claim 1 wherein the monomer is styrene.

5. A process in accordance with claim 1 wherein from about 10 percent to about 40 percent by volume of monomer, from about 0.5 percent to about 5 percent by weight of steric stabilizer, and from about 0.1 percent by weight to about 1.0 percent by weight of crosslinking compound are selected.

6. A process in accordance with claim 1 wherein the resulting particles have a fusing temperature of from about 100° C. to about 150° C.

7. An improved dispersion polymerization process for obtaining toner particles consisting essentially of (1) providing a solvent having dispersed therein steric stabilizers selected from the group consisting of hydroxy celluloses, poly(acrylic acid), poly(vinyl butyral), poly(vinyl pyridines), poly(vinyl pyrrolidone), and their copolymers, monomers, and initiator compounds; (2) subsequently adding thereto a crosslinking compound; (3) affecting polymerization of the resulting mixture by heating; (4) thereafter separating the particles formed of a diameter of from about 5 to about 20 microns; and (5) mixing the particles resulting with a dye solution.

8. A process in accordance with claim 7 wherein the cross-linking compound is divinyl benzene.

9. A process in accordance with claim 7 wherein polymerization is affected at a temperature of from about 50° C. to about 95° C.

10. A process in accordance with claim 7 wherein the monomer is styrene.

11. A process in accordance with claim 7 wherein from about 10 percent to about 40 percent by volume of monomer, from about 0.5 percent to about 5 percent by weight of steric stabilizer, and from about 0.1 percent by weight to about 1.0 percent by weight of crosslinking compound are selected.

12. A process in accordance with claim 7 wherein the resulting particles have a fusing temperature of from about 100° C. to about 150° C.

* * * * *